United States Patent [19]

Eminger

[11] 4,141,381
[45] Feb. 27, 1979

[54] SWING CHECK VALVE

[75] Inventor: Harry E. Eminger, Valencia, Pa.

[73] Assignee: Westinghouse Electric Corp., Pittsburgh, Pa.

[21] Appl. No.: 731,389

[22] Filed: Oct. 12, 1976

[51] Int. Cl.² .............................................. F16K 15/03
[52] U.S. Cl. ................................ 137/527.2; 137/527.4
[58] Field of Search ........................... 137/527–527.8, 137/855–858; 251/298

[56] References Cited

U.S. PATENT DOCUMENTS

| 1,294,003 | 2/1919 | Weaver | 137/527.8 X |
| 1,982,189 | 11/1934 | Anderson | 137/527.2 |
| 2,504,006 | 4/1950 | Davis | 137/527 X |
| 2,717,001 | 9/1955 | Perrault | 137/527.4 X |
| 3,613,720 | 10/1971 | Welch | 137/527.8 |

Primary Examiner—Robert G. Nilson
Attorney, Agent, or Firm—J. R. Campbell; Z. L. Dermer

[57] ABSTRACT

A swing check valve which includes a valve body having an inlet and outlet. A recess in the valve body designed to hold a seal ring and a check valve disc swingable between open and closed positions. The disc is supported by a high strength wire secured at one end in a support spacer pinned through bearing blocks fixed to the valve body and at its other end in a groove formed on the outer peripheral surface of the disc. The parts are designed and chosen such to provide a lightweight valve disc which is held open by minimum velocity of fluid flowing through the valve which thus reduces oscillations and accompanying wear of bearings supporting the valve operating parts.

5 Claims, 3 Drawing Figures

U.S. Patent  Feb. 27, 1979  4,141,381
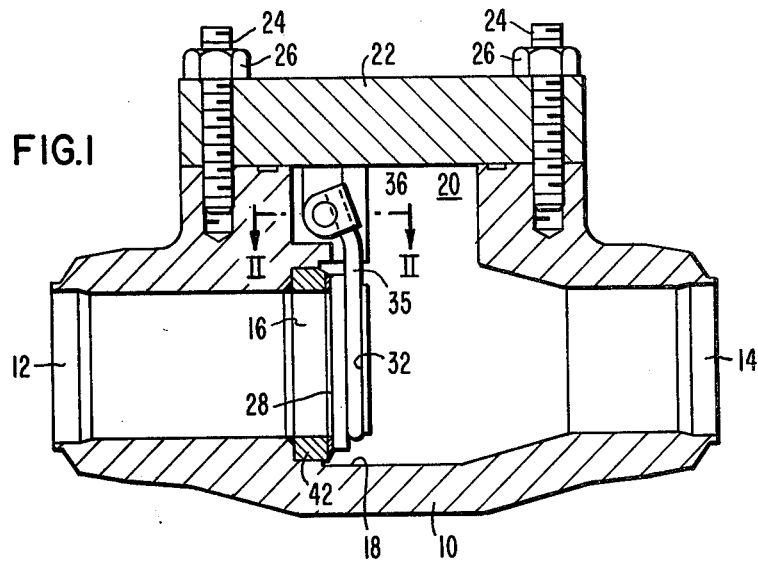
FIG.1
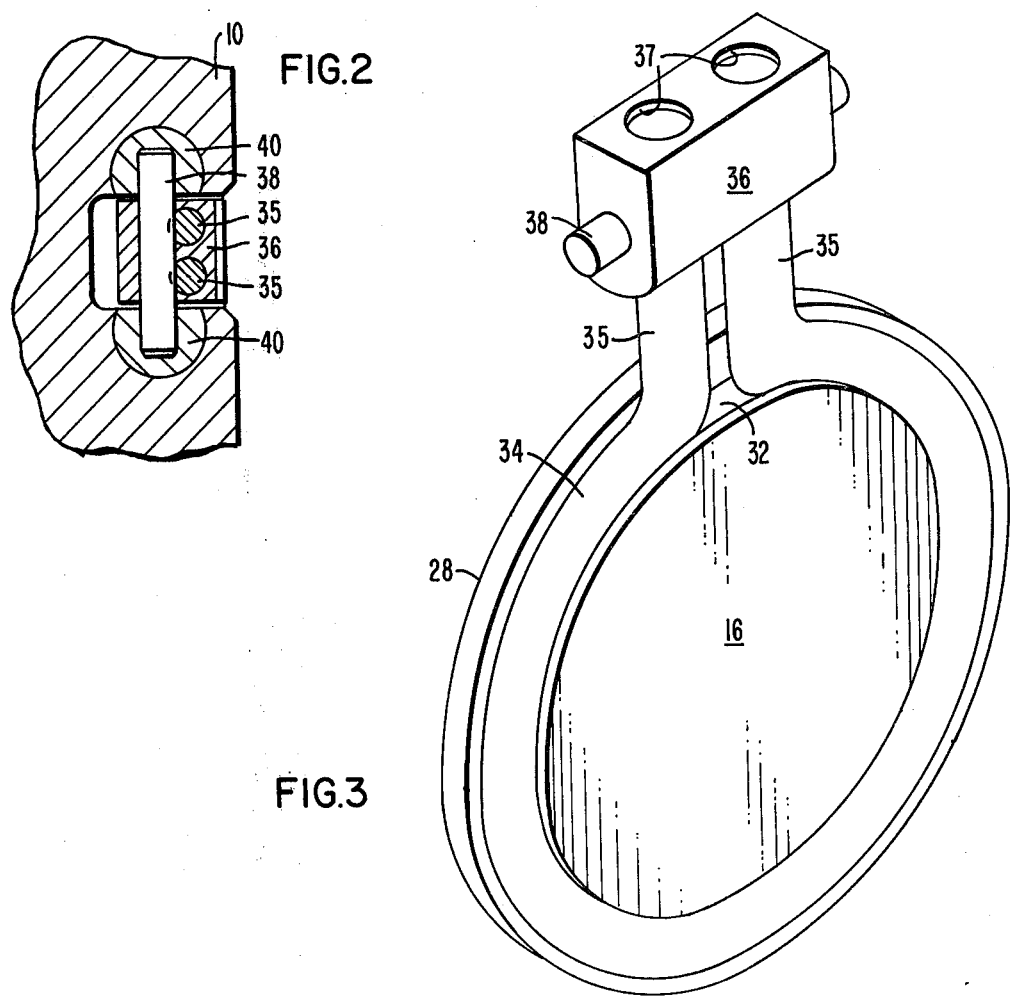
FIG.2
FIG.3

SWING CHECK VALVE

BACKGROUND OF THE INVENTION

The invention described herein relates to valves and more particularly to a check valve useful in a nuclear reactor and other fluid systems.

Conventional check valve constructions include a housing having a flow-through opening equipped with a valve seat arranged to receive a check valve disc which operates by the force of liquid or a fluid flowing therethrough between open or closed positions or somewhere between fully open or fully closed, depending on the force of the flowing fluid. The valve disc which contacts the valve seat to preclude liquid from reverse flow through the valve, contains a heavy integral portion in the center of the disc and on that side of the disc which faces the discharge outlet. A pivot arm is attached to a pin anchored to the central portion of the disc, or it is integral with the disc, while the other end of the arm is pivoted in bearing blocks mounted in the casting body, thereby permitting valve disc movement between open and closed positions to allow flow in one direction through the valve or preclude such flow in a reverse direction through the valve.

Since the valve disc is held open by the velocity pressure of liquid flowing through the valve, it is apparent that some minimum velocity will hold the valve disc open for each valve. However, unless the valve is held fully open, an additional pressure drop over that for which the valve has been designed, occurs through the valve which results in efficiency. Under these circumstances of a partially open valve, the valve also becomes unstable, valve disc oscillations occur and the pins and bearing blocks holding the valve disc wear at an accelerated rate.

SUMMARY OF THE INVENTION

The above disadvantages are overcome in accordance with the teachings of this invention by providing a valve disc for a valve which utilizes a high strength spring wire for the disc arm and a valve disc of much less weight than those of the prior art. This combination maximizes disc flexibility for improving its sealing characteristics when the valve is in the closed position. The disc arm of the spring wire is designed to encircle the peripheral surface of the disc and an improved method of attaching the spring wire to a hinged bearing block results in a simple but effective self-locking attachment which requires no other fasteners. The minimum weight disc-pivot arm assembly reduces the flow velocity required to move the disc to the full open, and hence stable, position and the valve accordingly is made suitable for a wide range of flow applications without internal modifications.

BRIEF DESCRIPTION OF THE DRAWINGS

While the specification concludes with claims particularly pointing out and distinctly claiming the subject matter of the invention, it is believed that the invention will be better understood from the following description taken in connection with the accompanying drawing, wherein:

FIG. 1 is a view elevation, partly in section, showing the internal design of the swing check valve;

FIG. 2 is a view taken on lines II—II of FIG. 1; and

FIG. 3 is a perspective view of the valve disc and the connected swing arm of this invention.

DESCRIPTION OF THE PREFERRED EMBODIMENT

Referring now to the drawing wherein like reference characters designate like or corresponding parts throughout the several views, there is shown in FIG. 1 a swing check valve which includes a valve body or housing 10 having an inlet 12 and an outlet 14 for the flow of liquid therethrough. A valve swing disc 16 mounted in the body swings to an open position under the influence of velocity of liquid flowing through the valve, and seats in the opposite direction to preclude the flow of liquid in the reverse direction through the valve.

A lower part of the valve body includes a step or recess 18 which merges into a bonnet formed in the upper end thereof which provides a space 20 into which the valve disc 16 is adapted to swing when moved to an open position. This space 20 is closed by a bonnet plate 22 held on the housing by studs 24 and nuts 26.

As indicated above, the velocity of liquid flowing through the valve and acting on the exposed surface 28 of the swing check valve disc 16, holds the disc in an open position. It is apparent that high velocities are required to hold present valves in an open, nearly horizontal position, and particularly those valves having thick discs and solid disc arms pivoted on the valve body. In those designs where velocities are not sufficiently great to hold the valve disc in a fully open position, an additional pressure drop occurs at the disc thus resulting in an inefficient valve. Under these circumstances of a valve disc held in a position less than a nearly horizontal position, liquid flow through the valve causes unstable conditions as a result of oscillatory pressure pulsations, and these in turn, accelerate wear of pins and bearing blocks used to support the disc arms.

To overcome these disadvantages, and primarily to improve valve efficiency, an improved check valve disc 16 is provided which includes a groove 32 formed on its outer peripheral surface. An Inconel disc arm 34 of high strength spring wire is shaped to a configuration to loosely fit in the groove 32 while its exposed free ends 35 terminate in openings 37 formed in a support spacer 36. The wire ends 35 are mechanically locked in the spacer by pin 38 which extends transversely to the wire end openings 37. This is accomplished by cutting a notch in each wire end at the point where the openings for the wire ends intersect the axially extending opening for pin 38. Both FIGS. 1 and 2 show that only a small notch need be made and that its cutout shape is complementary to the outer surface of the pin. It is apparent that when the notches in the wire ends are aligned with the pin slot and the pin then inserted thereinto, the pin surface will fit in the notches and thus lock the wire ends in spacer 36.

This assembly is then mounted in bearing blocks 40 which are inserted in the valve body 10. As illustrated in FIG. 2, the outwardly projecting ends of pin 38 fit in corresponding openings in the bearing blocks. When plate 22 is placed on studs 24 and secured in position, its lower surface overlies the bearing blocks thus preventing them from moving or being displaced during valve operation. The parts are sized such that when the valve disc swings to an open position, the space 20 is sufficiently large to accommodate the disc and its disc arms while still being in a position to have its surface 28 contacted by the liquid flowing through the valve.

The disc is arranged to seat on a ring 42 which is welded into the valve body 10 and the seat ring surface and face of disc 28 are each highly machined and finished to provide a substantially leak proof seal between the disc surface and the seat ring. The spring wire which comprises the disc arm is made of high strength Inconel X750 material while the disc comprises 17-4 Ph stainless steel which is heat treated to provide a hard wear resistant surface. It will be apparent to those skilled in the art that any heat treatable or age hardenable, high strength stainless steel may be used for the valve operating components.

The improved design of this invention which includes utilizing spring wire for the disc arm and the arrangement for attaching the wire to both the swing check valve disc and bearing blocks, results in a construction which minimizes disc arm weight and disc weight, while maximizing disc flexibility to achieve a highly effective seal when the valve is in a closed position. The use of high strength spring wire greatly reduces the mass of the pivot arm and disc, and hence results in a minimized internal envelope for the valve which makes possible a substantial reduction in both size and weight. The minimum weight disc-pivot arm assembly reduces the flow velocities required to move the disc to a fully open position with consequent increase in valve stability and reduction in pressure pulsations and oscillations in the valve which previously contributed substantially to heavy bearing wear.

The valve of this invention is designed to accommodate extremely high pressure-temperature values, and under a wide diversity of sizes. Valves currently are being designed in 2" to 30" sizes but these do not represent lower and upper limits. The valve will effectively operate in the several thousand psi pressure range with at least one specific use being contemplated at 10,000 psi. The lower pressure limits will be dependent on those flow velocities which will hold the valve disc open. Likewise, the materials selected for use in the valve construction will permit valve operations ranging from ambient temperatures to liquid metal applications where 1000° F temperatures are not uncommon. Another specific use for the valve will be in liquid metal cooled nuclear reactors which utilize liquid sodium as the coolant medium.

Accordingly, it will be apparent that many modifications and variations are possible in light of the above teachings. It therefore is to be understood that within the scope of the appended claims, the invention may be practiced other than as specifically described.

What is claimed is:

1. A swing check valve for facilitating flow of liquid in a forward direction while precluding reverse flow through the valve comprising:
   a valve body having an inlet and an outlet;
   a recessed portion in the central part of said valve of a size sufficient to accept a sealing ring which is welded therein;
   a lightweight swing check valve disc assembly mounted in said valve body;
   said check valve disc assembly including mounting means on one end thereof removably mounted in the valve body;
   spaced flexible arms interconnecting said mounting means with a valve disc designed to selectively engage and provide a seal with said seal ring;
   said spaced flexible arms including a bar of spring steel which is substantially closed on itself and has the two arm ends of said bar placed in close proximity to each other and fitted into said mounting means on the valve body, the remaining portion of said bar being secured to said disc to provide a lightweight disc assembly; and
   said valve disc assembly being arranged to swing into said recessed area from a substantially vertical closed valve position to a substantially horizontal valve open position when subjected to the velocity of liquid flowing through said valve.

2. A swing check valve for facilitating flow of liquid in a forward direction while precluding reverse flow through the valve comprising:
   a valve body having an inlet and an outlet;
   a recessed portion in the central part of said valve of a size sufficient to accept a sealing ring which is welded therein;
   a lightweight swing check valve disc assembly mounted in said valve body;
   said check valve disc assembly including mounting means on one end thereof removably mounted in the valve body;
   spaced flexible arms interconnecting said mounting means with a valve disc designed to selectively engage and provide a seal with said seal ring;
   said spaced flexible arms including a bar of spring steel shaped to the configuration of said disc, and said disc having a groove in its outer peripheral surface of a depth sufficient to loosely accept the bar of spring steel;
   said bar being essentially closed on itself and the free ends thereof being secured in said mounting means mounted in the valve body; and
   said valve disc assembly being arranged to swing into said recessed area from a substantially vertical closed valve position to a substantially horizontal valve open position when subjected to the velocity of liquid flowing through said valve.

3. A swing check valve for facilitating flow of liquid in a forward direction while precluding reverse flow through the valve comprising:
   a valve body having an inlet and an outlet;
   a recessed portion in the central part of said valve of a size sufficient to accept a sealing ring which is welded therein;
   a lightweight swing check valve disc assembly mounted in said valve body;
   said check valve disc assembly including mounting means on one end thereof removably mounted in the valve body;
   spaced flexible arms interconnecting said mounting means with a valve disc designed to selectively engage and provide a seal with said seal ring;
   said spaced flexible arms comprising a bar of spring steel of circular cross section having the main body thereof attached to said valve disc and the other free ends thereof secured to said mounting means; and
   said mounting means including a spacer arranged to accept the ends of said bar, and means supporting said spacer mounted in the valve body for permitting swinging movement of said valve disc assembly into said recessed area from a substantially vertical closed valve position to a substantially horizontal valve open position when subjected to the velocity of liquid flowing through said valve.

4. A swing check valve for facilitating flow of liquid in a forward direction while precluding reverse flow through the valve comprising:
   a valve body having an inlet and an outlet;
   a recessed portion in the central part of said valve of a size sufficient to accept a sealing ring which is welded therein;
   a lightweight swing check valve disc assembly mounted in said valve body;
   said check valve disc assembly including mounting means on one end thereof removably mounted in the valve body;
   spaced flexible arms interconnecting said mounting means with a valve disc designed to selectively engage and provide a seal with said seal ring;
   said mounting means comprising a pair of spaced bearing blocks fitted in said valve body;
   a pin interconnecting said blocks and
   a support spacer mounted on the central portion of said pin between said bearing blocks, and means securing said spaced flexible arms to said support spacer so that when the bearing blocks are placed in position on said housing, the disc assembly including said arms and disc is permitted to rotate between substantially vertical and horizontal positions in response to liquid flowing through said valve.

5. The combination according to claim 4 wherein said means securing said arms to said spacer includes openings in said spacer for said arms which intersect the opening for said pin; and
   notches in each of said arms which have a surface complementary to the surface of said pin, the arrangement being such that when said arms are positioned in said spacer openings and the notches aligned with the pin opening, the pin may be inserted in said pin opening and said notches to thereby lock the arms to said spacer through the medium of said pin.

* * * * *